(12) United States Patent
Cortegiano

(10) Patent No.: US 7,551,919 B2
(45) Date of Patent: Jun. 23, 2009

(54) METHOD FOR ADVERTISING ON DIGITAL CELLULAR TELEPHONES AND REDUCING COSTS TO THE END USER

(75) Inventor: Mark L. Cortegiano, Middle Village, NY (US)

(73) Assignee: Xcellasave, Inc., Middle Village, NY (US)

( * ) Notice: Subject to any disclaimer, the term of this patent is extended or adjusted under 35 U.S.C. 154(b) by 0 days.

(21) Appl. No.: 11/821,628

(22) Filed: Jun. 25, 2007

(65) Prior Publication Data

US 2008/0045195 A1 Feb. 21, 2008

Related U.S. Application Data

(63) Continuation of application No. 10/978,516, filed on Nov. 1, 2004, now Pat. No. 7,251,476.

(51) Int. Cl.
H04M 3/42 (2006.01)
H04W 4/00 (2006.01)

(52) U.S. Cl. .................................. 455/414.1; 455/466

(58) Field of Classification Search .................. 455/466, 455/503, 414.1, 406–409; 705/14, 27; 379/93.12
See application file for complete search history.

(56) References Cited

U.S. PATENT DOCUMENTS

| | | | |
|---|---|---|---|
| 4,890,315 A | 12/1989 | Bendixen et al. | |
| 5,539,810 A | 7/1996 | Kennedy, III et al. | |
| 5,544,225 A | 8/1996 | Kennedy, III et al. | |
| 5,799,249 A | 8/1998 | Kennedy, III et al. | |
| 5,852,775 A | 12/1998 | Hidary | |
| 5,889,852 A | 3/1999 | Rosecrans et al. | |
| 5,983,108 A | 11/1999 | Kennedy, III et al. | |
| 6,061,558 A | 5/2000 | Kennedy, III et al. | |
| 6,084,628 A | 7/2000 | Sawyer | |
| 6,252,544 B1 | 6/2001 | Hoffberg | |
| 6,278,499 B1 | 8/2001 | Darbee et al. | |
| 6,363,419 B1 | 3/2002 | Martin, Jr. et al. | |

(Continued)

Primary Examiner—George Eng
Assistant Examiner—Michael Faragalla
(74) Attorney, Agent, or Firm—Brooks, Cameron & Huebsch, PLLC

(57) ABSTRACT

The present invention relates to a method for displaying messages, such as advertisements, on digital wireless communication devices, such as digital cellular telephones, comprising the steps of creating at least one visual advertising message in the form of an information file for display on a digital wireless communication device, valuating the at least one advertising message, transmitting the at least one advertising message to a database, wherein the database is in communication with the wireless communication device via a wireless communications network or system, such as a cellular telephone network, transmitting according to a predetermined schedule the at least one advertising message from the database via the wireless communication system to the wireless communication device, wherein the wireless communication device chosen for reception of the at least one advertising message contains necessary software for displaying the advertising message and a display, recording the date and time the at least one wireless communication device receives the at least one advertising message, displaying the at least one advertising message on the digital wireless communication device such that the display does not interfere with the operation of the digital wireless communication device, and applying the valuation of the at least one advertising message as credit to a user account associated with the digital wireless communication device.

19 Claims, 9 Drawing Sheets

U.S. PATENT DOCUMENTS

| | | |
|---|---|---|
| 6,385,622 B2 | 5/2002 | Bouve et al. |
| 6,408,307 B1 | 6/2002 | Semple et al. |
| 6,429,812 B1 | 8/2002 | Hoffberg |
| 6,535,726 B1 | 3/2003 | Johnson |
| 6,546,002 B1 | 4/2003 | Kim |
| 6,549,625 B1 | 4/2003 | Rautila et al. |
| 6,564,047 B1 | 5/2003 | Steele et al. |
| 6,601,040 B1 | 7/2003 | Kolls |
| 6,604,086 B1 | 8/2003 | Kolls |
| 6,625,464 B1 * | 9/2003 | Bandy et al. ............... 455/503 |
| 6,674,448 B1 | 1/2004 | Garahi et al. |
| 6,714,797 B1 | 3/2004 | Rautila |
| 6,772,174 B1 | 8/2004 | Pettersson |
| 6,785,711 B1 | 8/2004 | Motoyama et al. |
| 6,810,077 B1 | 10/2004 | Dezonno |
| 6,828,993 B1 | 12/2004 | Hendricks et al. |
| 6,832,207 B1 | 12/2004 | Shkedi |
| 6,862,445 B1 | 3/2005 | Cohen |
| 6,879,835 B2 | 4/2005 | Greene et al. |
| 7,251,476 B2 | 7/2007 | Cortegiano |
| 2002/0085027 A1 * | 7/2002 | Kim ........................... 345/738 |
| 2003/0003929 A1 * | 1/2003 | Himmel et al. ............. 455/466 |
| 2004/0259599 A1 | 12/2004 | Okawa |
| 2005/0125354 A1 | 6/2005 | Pisaris-Henderson et al. |
| 2005/0239446 A1 * | 10/2005 | Tagawa et al. ........... 455/414.1 |

* cited by examiner

Fig. 5

| Power on | Power off | A1 | A2 | Ⓘ | A3 | Power off | Power on | A4 | Ⓘ | Power off | Power on | Ⓘ | A5 | A6 | Power off | continued

| Power on | Ⓘ | A7 | A8 | A9 | A10 | Power off | Power on | A1 | etc......... |

| 2/1/98 | On | A1 | A2 | A3 | off | on | A4 | Ⓘ | A5 | A6 | off |
|--------|----|----|----|----|-----|----|----|---|----|----|-----|
| 2/3/98 | On | A3 | A7 | | | | | | | | |

Scroll and Pause

Fade in, fade out.

METHOD FOR ADVERTISING ON DIGITAL CELLULAR TELEPHONES AND REDUCING COSTS TO THE END USER

CROSS REFERENCE TO RELATED APPLICATIONS

This application is a continuation of U.S. application Ser. No. 10/978,516, filed Nov. 1, 2004, now U.S. Pat. No. 7,251,476, the specification of which is incorporated herein by reference.

FIELD OF THE INVENTION

This invention relates to a method for displaying messages such as advertisements over wireless communications networks, and particularly to digital cellular telephone services such as PCS ("Personal Communications Services") telephones. This method provides a user with advertisement information that may be updated according to a flexible time schedule and that may be displayed in a number of different ways. This method also provides significant benefit to the user by lowering the net costs of the user for subscribing to the wireless service by shifting the costs of the user to the message originator, such as an advertiser.

BACKGROUND OF THE INVENTION

Digital wireless communication services, such as Personal Communications Services ("PCS"), provide all the advantages of a traditional landline telephone plus all the conveniences of a cellular phone at a reduced cost in improved capability. PCS, for example operates in specific geographical areas and frequency bands established by government regulations. In this way, carriers are enabled to provide new specialized wireless or mobile services in specified geographic areas. PCS, for example, is a digital service wherein each carrier has a different array of antennas around the local area to provide service.

Digital wireless communication systems, such as PCS, offer the ability to customize service to meet the needs of the user. Such systems provide features not always available with analog cellular phones, including voice mail, Caller ID, call waiting, call forwarding, and paging. PCS and other digital wireless telephones can receive and display textual messages, and have a more sophisticated display capability than typical cellular telephones. It would be advantageous to utilize this greater display capability along with the specialized features associated with digital wireless communication systems, to provide an advertising system with the ability to transmit messages to a user in such a way that the user can receive the messages without interference with normal operation of the phone. The current invention provides such an information system.

It would be further advantageous to provide a business method incorporating the advertising system of the present invention to provide a reverse subscription method such that the value of the messages or advertisements displayed over the digital cellular telephone system offset the cost of the wireless communications service to the user. In essence, the advertisers contribute to the cost of the user account in exchange for the right to display an advertising message on the user's digital telephone.

SUMMARY OF THE INVENTION

The current invention provides a method for displaying messages, such as advertisements, over digital wireless communications devices, such as PCS and other digital telephones. The current inventions changes the functionality of the existing hardware of a PCS or other wireless network to provide users with advertising information that is updated at the beginning of a specified time period or updated upon the occurrence of a specified event. The advertisements are consolidated onto a recording medium and transferred to a database, after which the information from the database is downloaded, via a wireless communication system into the memory of a digital telephone or other wireless communication device. The database is preferably the home location register of the wireless telephone, but may be an outside database connected to the home location register. When the telephone or other digital wireless communication device is powered on, the messages, preferably in the form of advertisements, are played for the user according to a chosen play sequence and display style. The advertisements may be played in consecutive order or prioritized by ranking by a predetermined priority scheme. The playing of the advertisements does not interfere with normal operation of the digital telephone or other wireless communication device, because the advertisements are preferably only played when the phone is on but not in use. The program necessary to display the downloaded advertisement information is preferably downloaded separately into the memory of the telephone. The operating cost to the user of the digital cellular telephone, typically the subscription account or service plan, is reduced by the value of the advertising displayed on the user's telephone.

One embodiment of the current invention is a method for providing information to a wireless telephone user, comprising the steps of recording the information onto a recording medium; transferring the information from the recording medium to a database; and downloading the information, via a wireless communications system, from the database into a memory of the phone according to a time schedule; wherein when the phone is powered on, the information will be played for the user according to a specified play sequence and according to a specified display style, such that the displayed information does not interfere with normal use of the phone.

The recording medium may be at least one of a CD, DVD, tape, and diskettes. The database may be a home location register of the phone, or an outside database connected to a home location register of the phone. The time schedule is specified such that when the phone is first powered on during a specified time period, the information is downloaded into the phone's memory. The information preferably consists of at least one advertisement, but other information is contemplated In another embodiment of the current invention, the play sequence may be such that the advertisements are played in sequential order; each advertisement is played for a specified time interval; the advertisements are not played during an interruption event; the advertisements are not played when the telephone is off; when the interruption event is over, the sequence resumes with the first advertisement not yet played; when the telephone is powered on again, the sequence resumes with the first advertisement not yet played; and after the last advertisement is played, the sequence returns to the beginning following a chosen time delay.

In another embodiment of the current invention, the play sequence is such that the advertisements are played in sequential order; each advertisement is played for a specified time interval; the advertisements are not played during an interruption event; the advertisements are not played when the phone is off; when the interruption event is over, the sequence resumes with the first advertisement not yet played; when the phone is powered on again, the sequence resumes with the first advertisement not immediately played after power-up; and after the last advertisement is played, the sequence returns to the beginning following a chosen time delay.

In another embodiment of the current invention, the play sequence is such that one advertisement is played until the phone is powered off, and a next advertisement is played when the phone is powered on again.

Preferably each advertisement is played for a specified time interval. Furthermore, the advertisements may be ranked in order of priority on a specified date, wherein the priority advertisements are played before the play sequence resumes on the specified date. Also, the current invention may provide that the advertisement is not marked as played until it is played for a specified time interval.

It will be appreciated that the play sequence and the duration that each advertisement is played may depend on the nature of advertisement and the information contained therein. As such, one of skill in the art will understand that the play sequence may be varied according to the geographic location of the telephone or other digital communications device. The play sequence may also comprise a random ordered play, or multiple prioritized play sequences dependent on the time of day or day of week, the location of the telephone, the amount of usage of the phone, or the duration of time between interruption events.

The information may be displayed in at least one of audio form and visual form. The information displayed in visual form may be at least one of fixed images, moving or animated images, text images, graphical images, and digitized images.

An interruption event is a member of the group comprising a keypad input, an incoming transmission, an outgoing transmission, any display initiated by the programming of the telephone or other wireless communication device associated with the operation of the telephone, tuning the telephone on or off, and other similar functional events associated with the operation of the telephone and the like. The incoming transmission is a member of the group comprising a call, a voice mail message, an electronic mail message, a page, a stock quote, or any other similar transmission type commonly associated with wireless communications systems.

In one embodiment of the current invention, the display style is such that an advertisement scrolls from the bottom of the display to the top of the display, and may pause near the middle of the display. In another embodiment, the advertisement fades into view and then fades out of view. In another embodiment, the display style is such that the advertisement blinks at least once.

Another embodiment of the current invention is a method for providing information to a wireless phone user, comprising the steps of powering on the phone; storing a current date in a memory of the phone; registering with a home location register; checking a user profile to detect an information file which contains at least one advertisement; opening and reading the information file: noting a start date and an end date of the information file; comparing the current date with the start and end dates; downloading the information file if it is the first time the user has powered on the phone after the start date; and initiating a play sequence for the information file according to a display style if the current date is after the start date and before the end date.

Yet another embodiment of the invention, provides a business method of offsetting costs to the end user of a wireless communications network by applying the monetary value to an advertiser of advertising messages displayed over a wireless phone to the end user account, thereby reducing the outstanding balance of the account.

A further embodiment of the invention, provides a business method for advertising on digital wireless communication devices, comprising the steps: of creating at least one visual advertising message in the form of an information file for display on a digital telephone; valuating the at least one advertising message; transmitting the at least one advertising message to a database, wherein the database is in communication with networked wireless communication devices; transmitting the at least one visual advertising message from the database to individual wireless communications devices, wherein the individual wireless communication device chosen for reception of the at least one advertising message contains necessary software for receiving and displaying the at least one advertising message; electronically recording the date and time the at least one digital wireless communication device receives the at least one advertising message; displaying the at least one advertising message on the digital wireless communication device according to a predetermined schedule, wherein the display of the at least one advertising message does not interfere with usability or functionality of the wireless communication device; and applying the valuation of the at least one advertising message to user account so as to adjust the outstanding monetary balance of the user account by the valuation amount.

BRIEF DESCRIPTION OF THE FIGURES

FIG. 5 illustrates a play sequence according to another embodiment of the current invention;

FIG. 6 illustrates a play sequence according to another embodiment of the current invention;

FIG. 7 illustrates a play sequence according to another embodiment of the current invention;

DETAILED DESCRIPTION OF THE INVENTION

In general, this invention provides a method for advertising over digital wireless communications devices, such as PCS telephones, whereby advertisement information, or other suitable information, is downloaded to a portable wireless communication device, such as a PCS telephone and preferably temporarily stored in the telephone's memory. When the phone is activated, the advertisement information may be played for the user in a number of different ways. The advertisement preferably disappears from the display upon the occurrence of certain events, including when the user powers down the phone, activates the keypad, receives an incoming transmission or initiates an outgoing transmission, such as a phone call. Alternatively, the advertisement may also be displayed in any manner such that the advertisement does not interfere with the operability of the communications devices, i.e., the advertisement is passive to certain events, including when the user powers down the communications device, activates the keypad, receives an incoming transmission, or initiates an outgoing transmission.

Figure 1:
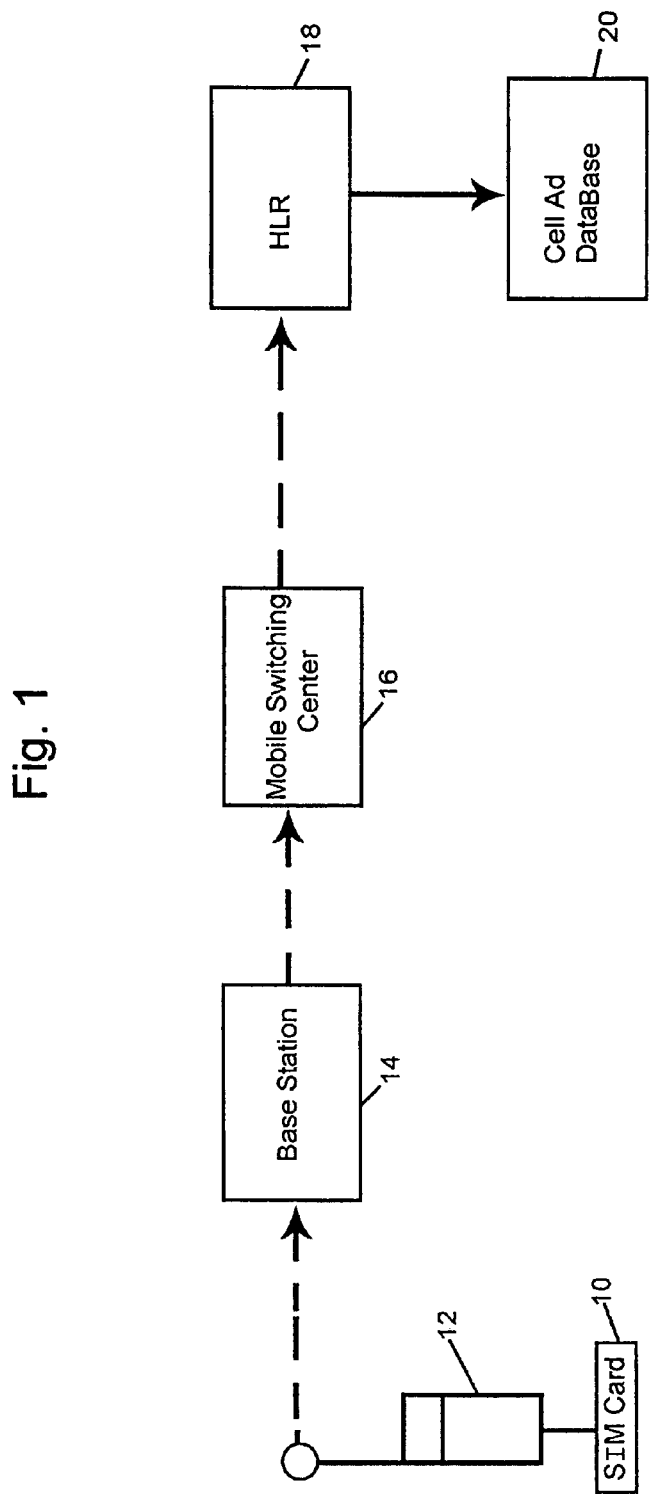
FIG. 1 is a block diagram of a standard PCS telephone network.

FIG. 1 shows a block diagram of a standard PCS telephone network. Included in the network is a subscriber identity module ("SIM") card 10, a PCS terminal 12, a base station 14, a mobile switching center 16, a home location register ("HLR") 18, and a cellular advertisement database 20.

The SIM card 10 is a removable card that stores important subscriber/user information, such as identification numbers, details of the user's service plan, and abbreviated dialing codes selected by the user. The SIM card is the users link to the PCS system. By removing the SIM card, the user disables the telephone, except perhaps for the ability to make emergency calls. To change telephones, the user may simply move the SIM card from one telephone to another. In this way, the user may use the new phone while retaining his or her own telephone number and specialized calling features.

The base station 14 is a stationary collection of equipment that communicates by radio with nearby PCS phones. The geographical area covered by a base station is known as a "cell." The home location register 18 is a database that typically contains subscription information such as recorded information about the terminal's current location and status. In typical operation, a call request for a terminal 12 arrives at the terminal's mobile switching center 16, which then interrogates the terminal's home location register 18 in order to determine the location of the terminal 12.

In accordance with one aspect of the current invention, the home location register 18 preferably also acts as a database for storing advertisement information before the information is downloaded to the telephone's memory, preferably the random access memory ("RAM"). Flash memory, EEPROPM, EPROM, ROM. SRAM, DRAM and other forms of memory may be used. Alternatively, the database may be a cellular advertisement database 20 outside the wireless network that is in electronic communication with the home location register 18, whereby the advertisement information may be delivered to the home location register 18 by disk or direct transmission. By utilizing the home location register 18 in this way, there is no need to alter the PCS hardware to insert the advertisements in order to implement the current invention. Moreover, the program necessary to display the downloaded advertisement information is also downloaded separately into the phone's memory. This results in an inexpensive method that requires no action by the user.

Figure 2:
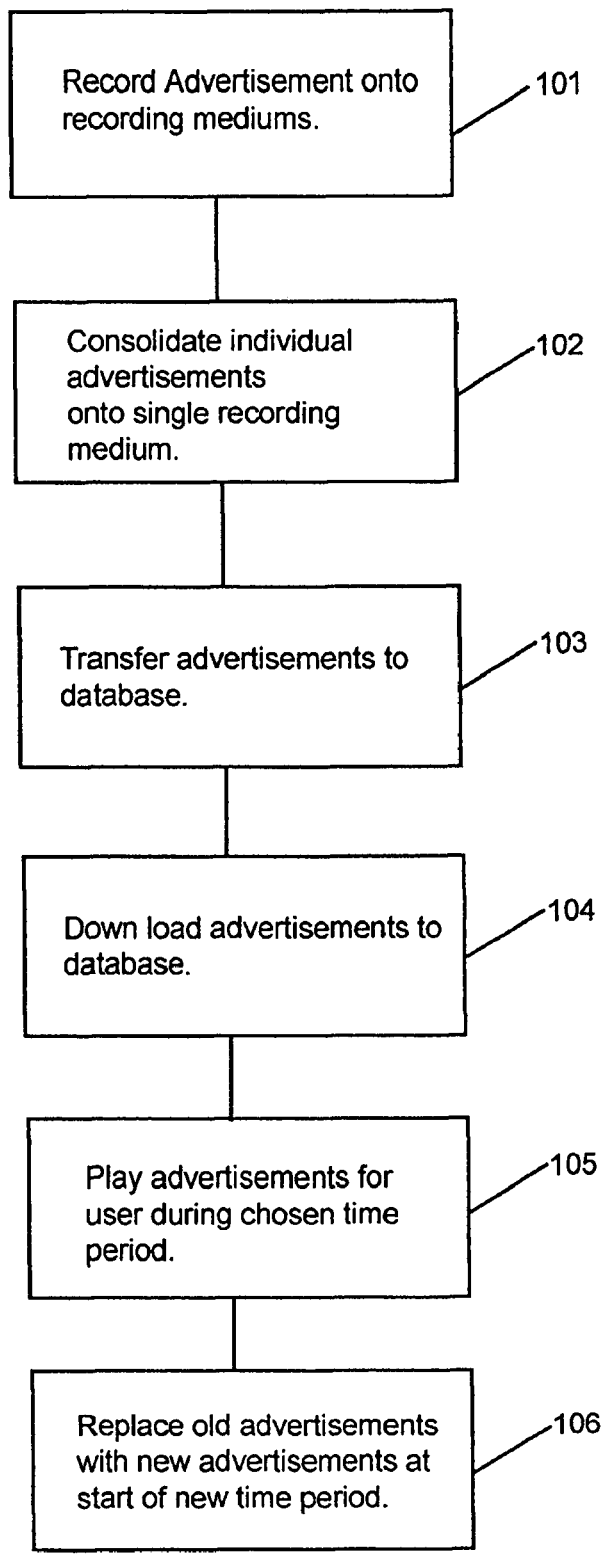
FIG. 2 is a flowchart of a method of advertising over PCS telephones according to one embodiment of the current invention.

FIG. 2 is a flowchart of a method of advertising over PCS telephones according to one embodiment of the current invention. In Step 101, advertising information from various providers is recorded and stored onto a recording medium such as a compact disc ("CD"), digital video disc ("DVD"), diskette, tape, or any other appropriate medium. In Step 102, the individual advertisements are consolidated onto a single recording medium if necessary. In Step 103, the information from the recording medium is transferred as a group to a database. In Step 104, the information from the database is downloaded via a wireless communications network into the telephone's RAM. This occurs according to a specified time schedule, such as the first time the user powers on the telephone for the month. The information is stored in the RAM for a specified time period, such as one month, and replayed in Step 105 until it is replaced by new downloaded information in Step 106.

Figure 3:
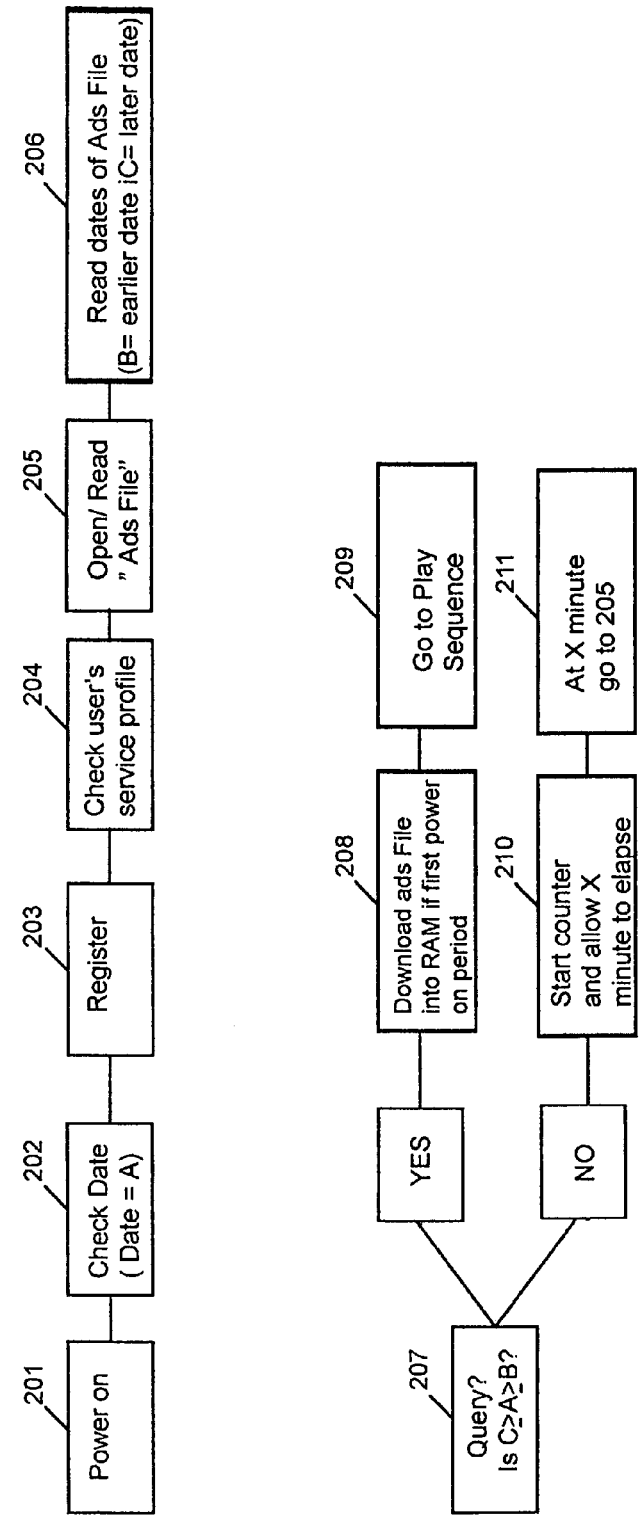
FIG. 3 is a flowchart of the start-up sequence of a PCS terminal 12 according to one embodiment of the current invention.

FIG. 3 is a flowchart of the start-up sequence of a PCS terminal 12 according to one embodiment of the current invention. The phone is powered on by the user in Step 201. In Step 202, the phone stores the current date in the RAM as "A" so that it may later retrieve the date for comparison with the advertising period. The phone then registers with the home location register 18 in Step 203, per standard procedure. In Step 204, the home location register 18 checks the user's service profile to determine which services the user has available to the users terminal. At this point, according to one aspect of the current invention, the home location register 18 preferably detects the Ads File in the user's profile, which is the file that stores the advertisement data. Step 205 opens and reads the Ads File, and Step 206 notes the date that the Ads File is set to begin ("B") along with the date that the Ads File expires ("C"). In Step 207, the home location register 18 compares the current date with the dates of the advertising period to determine whether it is within the time period during which the ads file is to be played. If it is the first one that the user has powered on the PCS phone during the advertising period, then Step 208 directs the home location register 18 to download the Ads File into the memory of the phone. If the Ads File is to be played, the play sequence is initiated by Step 209. Otherwise, Step 210 counts until a specified number of minutes elapses, at which point the program returns to Step 205.

The Ads File is preferably located in a part of the memory where it can be replaced periodically, but will not be lost when the phone is powered off. The Ads File preferably should have REM statements at the beginning which indicate the dates of use and even name the period as a whole (e.g., "B"=10/1/2004; "C"=10/31/2004; Period=October) and should preferably also include numbered markers which indicate the order of the ads.

Figure 4:
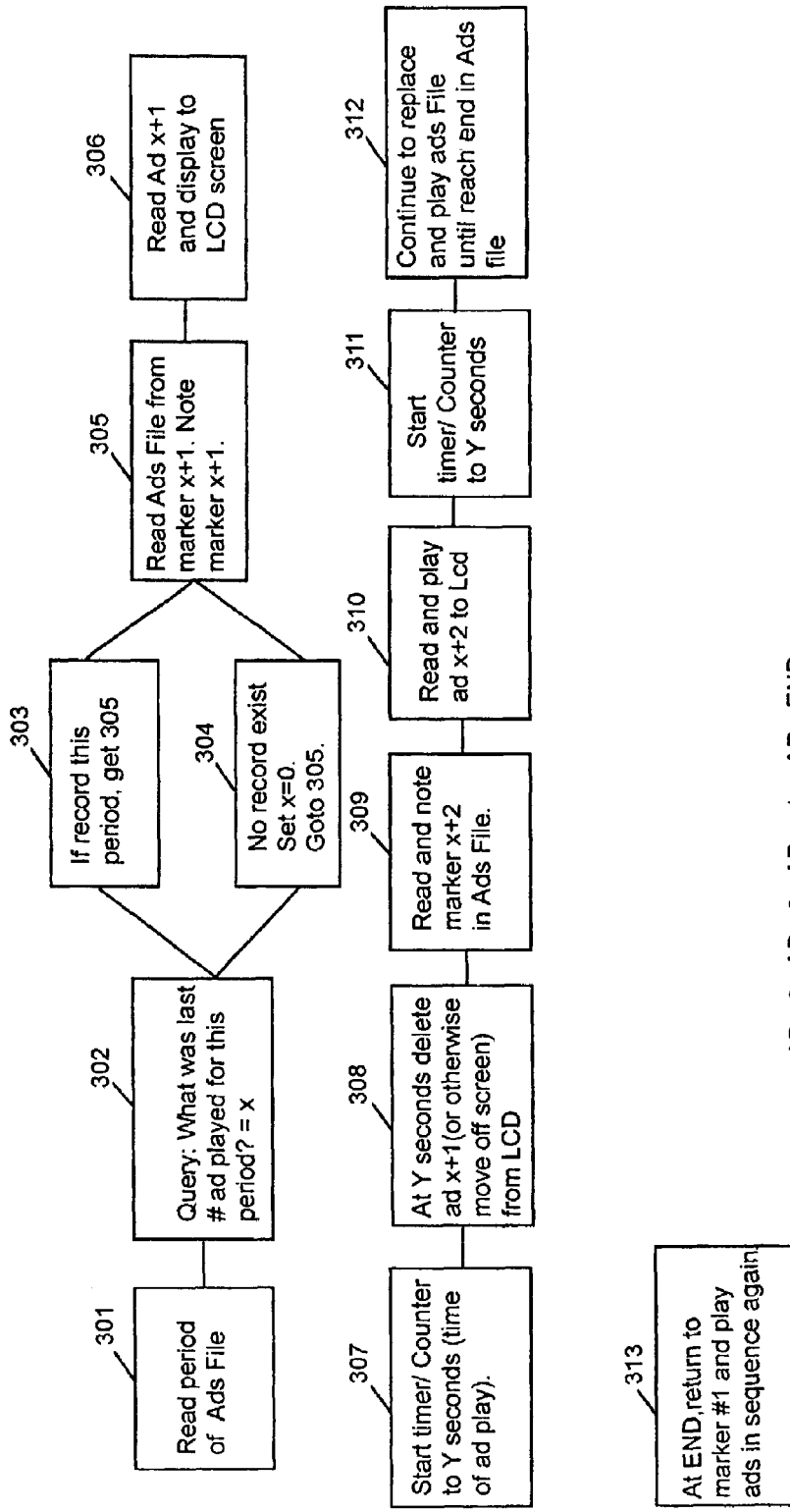
FIG. 4 is a flowchart of a play sequence according to one embodiment of the current invention.

FIG. 4 is a flowchart of a play sequence according to one embodiment of the current invention.

In FIG. 4, the advertisements are chosen to be played consecutively. It should be noted, however, that the play sequence may be altered in whatever way the advertiser desires. For example, ad #1 could remain playing until the phone is powered off, and ad #2 could begin playing when the phone is powered on again. Moreover, the sequence could be altered to play certain ads more than once. Also, the timing may be altered in whatever way necessary. FIG. 4 is illustrative of the basic steps in replaying a series of advertisements in a predetermined order. Those of skill in the art will appreciate that any predetermined order may be chosen.

In Step 301, the time period of the Ads File is read. The time period is the length of time the ads will be played. For example, the ads could be chosen to play during the month of December. It should be appreciated that the time period for which the ads is largely variable on the content of the advertisement. In Step 302, a query determines the last numbered ad played during the designated period and sets variable X equal to that number. If no record exists of an ad having been played during this period, X will be set to zero in Step 304. Step 305 reads the Ads File starting from marker X+1 and notes that marker. Step 306 reads ad number X+1 and plays it to the LCD screen. Step 307 determines the length of time Y that the ad will be played by starting the timer and setting the counter to Y seconds. After Y seconds, Step 308 deletes ad number X+1 from the screen. Step 309 reads and notes the next marker X+2 in the Ads File. Step 310 reads ad number X+2 and displays it on the screen. Step 311 starts the timer and sets the counter to Y seconds. The process continues in Step 312 until the end of the Ads File is reached, at which point Step 313 returns to the first marker and plays the ads in sequence again.

The method of advertising according to the current invention is preferably implemented in such a way that the advertisements do not interfere with the normal operation of the digital wireless communication device, such as a PCS phone. Each time an advertisement is played for a user, the playback will continue until an interruption event occurs. An interruption event is any event which is a normal function of the digital wireless communication device. The advertisement information may be interrupted by such an event when the telephone is commanded through the keypad input to take action, such as place an outgoing call or when the telephone receives an incoming transmission, such as a call, voicemail, e-mail, page, stock quote, or the like. If an interruption event occurs, the advertisement preferably should cease to be displayed on the LCD and the marker and time elapsed should be noted. Once the interruption event is over, the previous ad may resume for the time remaining in the play, or the advertiser may choose that the next ad be played.

The advertisement information may be played according to a chosen or specified play sequence. FIG. 5 illustrates one such play sequence in accordance with one embodiment of the current invention. In this embodiment, the advertisements are played in sequential order according to a specified time period until an interruption event occurs or the telephone is powered off. When the interruption event is over or the telephone is powered on again, the screen resumes displaying the advertisements in sequential order. After all of the advertisements are played, the program starts over front the first advertisement. FIG. 5 assumes ten different advertisements, represented by A1 to A10. When the telephone is first powered on for the month, the advertisement information is downloaded into the RAM. Subsequently, the first advertisement (A1) is played for the user. After a specified time interval, and if no interruption event has occurred, the telephone will display A2. When an interruption event ("I") occurs, the advertisements will cease to be played and the RAM will note where it is in the sequence. When the interruption event is over, the screen displays A3. After the telephone is powered off and then powered on again at a subsequent time, A4 will be played. The sequence continues in this order and then repeats after each cycle is over.

Figure 6:
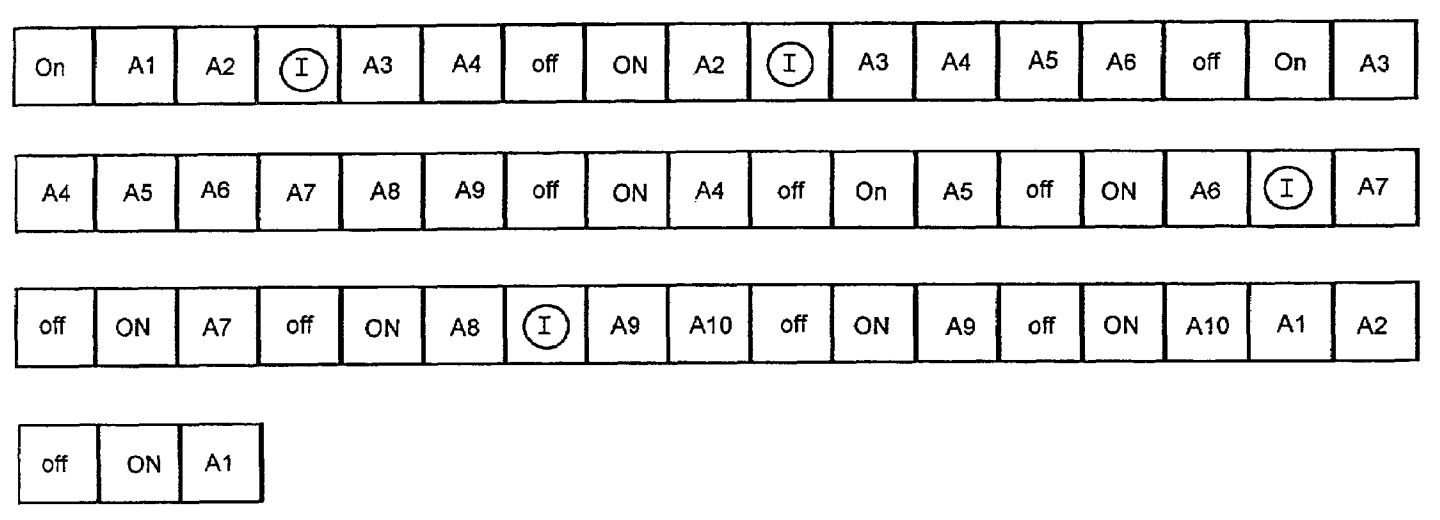

FIG. 6 Illustrates a play sequence that may be implemented according to another embodiment of the current invention. In this embodiment, the advertisements are played in sequential order, and if an interrupt event occurs, the order is continued from where it left off just as before. If the phone is powered down, however, upon power-up the sequence begins with the firm advertisement that was not initially displayed at power-up. In this way, each advertisement has the opportunity to be played immediately after power-up in order to gain exposure to the user during the time at which the user may most likely be looking at the phone. Thus, in the example shown in FIG. 6, the phone is powered on and A1 is played, followed by A2. After the interruption event occurs, the advertisements continue to be played in sequential order beginning with A3. Once the phone is powered off after A4 and then powered on again at a subsequent time, the sequence begins with A2, as A2 represents the first advertisement in the sequence which was not initially displayed at power-up. After the last advertisement has a chance to be initially displayed, the sequence starts over.

Figure 7:
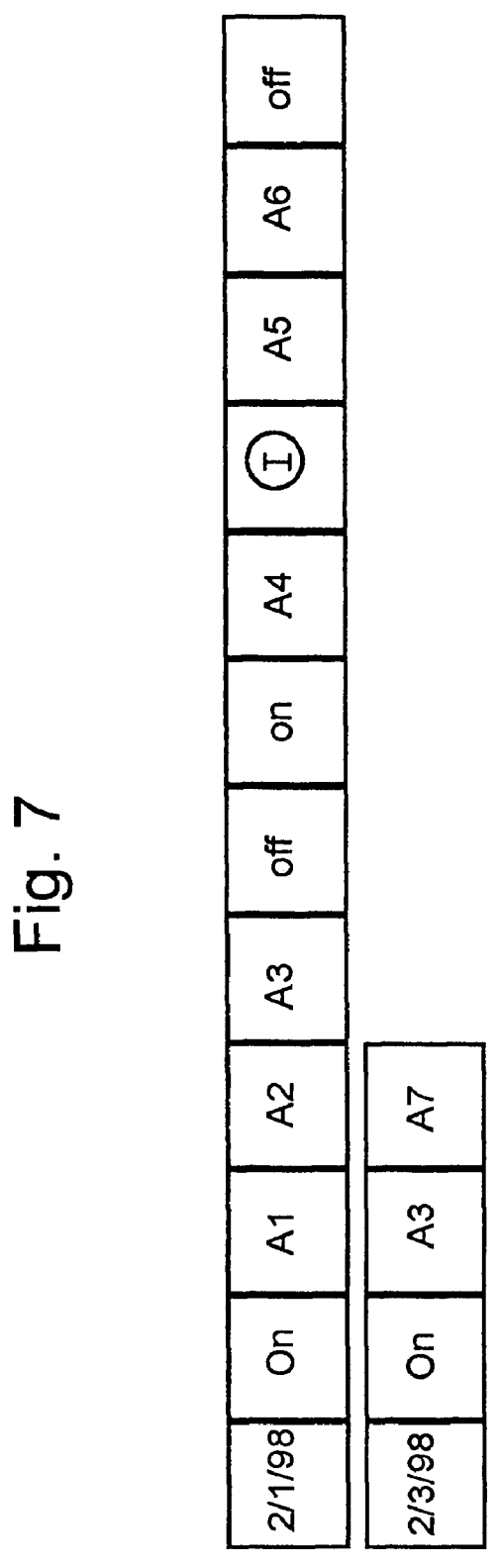

There are additional features that may be utilized with the current invention, including with the embodiments disclosed in FIGS. 5 and 6. In one embodiment, priority may be given to certain advertisements on certain dates. This would require the program to check the date at power-on and then check to see whether any advertisements are designated for that date. The priority advertisement would then be played before the sequence is resumed. FIG. 7 illustrates this embodiment of the current invention. A3 is designated as a priority advertisement on the date of Feb. 3, 1998. On February 1, the phone is powered on and the sequence plays A1, A2, and A3 in sequential order. After being powered off, upon being powered on the phone resumes with the next advertisement in the sequence, A4. After an interruption event occurs, A5 and A6 are displayed, followed by power-off.

When the phone is powered on February 3, the program, performing its daily check for priority advertisements, discovers that A3 is a priority advertisement for that day. The program then plays A3, followed by a return to the normal sequential order by playing A7.

Another feature of the current invention is that an ad is not marked as played until it has been displayed for a specific time interval. If the advertisement has not been played for the full time interval, the program will treat it as not having been played at all, and the sequence will resume with that advertisement.

The advertising information is displayed on the phone's screen, and may be displayed in audio form, visual form, or a combination of both. Information in visual form may be displayed as fixed images, moving, or animated images. In one embodiment of the invention, the advertising information is a fixed image that displays a logo, trademark, or slogan. Also displayed may be the telephone number or email address of the advertising company. Another embodiment of the invention includes moving images or sound as the advertising information, as well as digitized images.

Figure 8:
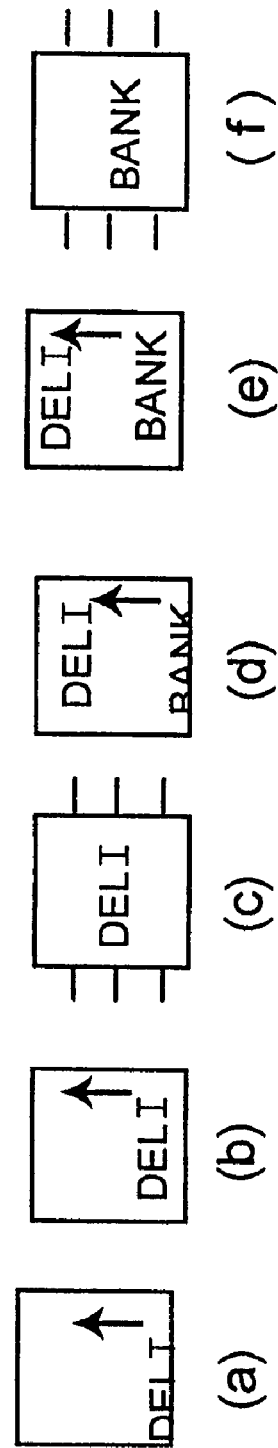
FIG. 8 illustrates the "scroll and pause" display style according to one embodiment of the current invention.

There are several possible display styles which dictate how a particular advertisement is to be displayed on the screen. FIG. 8 shows one embodiment according to the current invention, whereby the advertising information is displayed in a "scroll and pause" style. In this style, an advertisement starts off the screen and scrolls to the middle of the screen. where it pauses for a specified time interval and then continues to scroll until it is off the screen. (a) in FIG. 8 is a snapshot of the partial image of an advertisement as it begins to appear on the screen. In (b), the advertisement is shown scrolling towards the middle of the screen in order to be displayed in full as shown in (c). (d) is a snapshot of the screen as the advertisement is scrolling off and a new advertisement is scrolling on. (e) and (f) continue the process until the new advertisement is displayed in full. Variables that may be altered in this display method include the scrolling speed and the length of time that the advertisement remains on full display in the middle of the screen.

Figure 9:
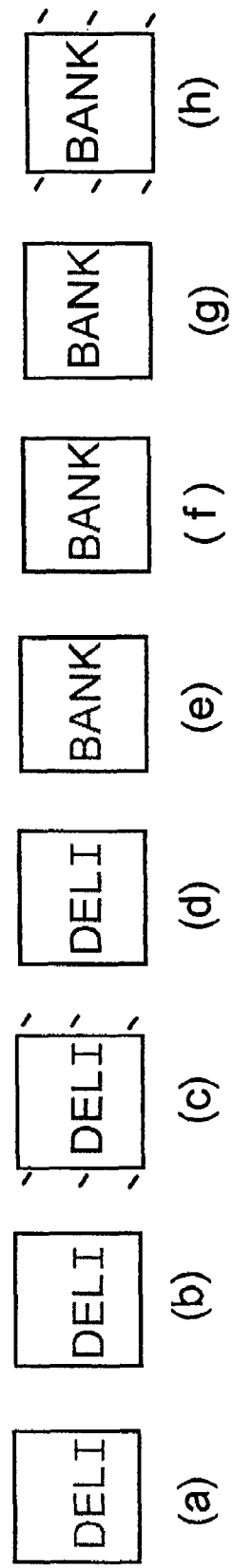
FIG. 9 illustrates the "fade in, fade out" display style according to another embodiment of the current invention.

FIG. 9 shows another embodiment of the current invention whereby the advertising information is displayed in a "fade in, fade out" style. (a) and (b) in FIG. 9 show the advertisement as it is fading in. (c) shows the advertisement in loll display for a specified time interval. (d) and (e) show the advertisement fading out, whereupon the sequence repeats with a new advertisement in (f), (g), and (h).

Other embodiments of the current invention are envisioned that incorporate display styles known in the art, such as a "blinking" style. In this style, the display blinks with different advertisements each time the information appears on the screen. The advertiser may choose to vary the parameters of the display, for example, by setting time lengths regarding how long an advertisement remains on the screen before being deleted and replaced with another advertisement. Additionally, it will be appreciated that the intensity of the display may be varied in order to achieve a desirable and efficient energy consumption.

Another embodiment of the invention is directed to a method for advertising on a digital wireless communication devices such as a PCS telephone. The method adds significant value to the end user by reducing the cost of the communication device, typically a subscription or service plan with a network provider. The method reduces the cost of the user's subscription with the network provider by the valuation of the advertising that the user allows to be displayed on the users wireless communication device. The method of this embodiment preferably begins by creating at least one visual advertising message in the form of an information file for display on a digital telephone. Next a monetary value is preferably established for displaying the at least one advertising message on the digital wireless communication device over a period of time. The at least one visual advertising message is then transmitted via suitable transmission means to a central database. The database is preferably the home location register of the communication device, as is typically found in PCS systems. It will be appreciated that the database is in communication with a networked wireless communication system, of which the wireless communication devices, such as the PCS phone, are compatible with and preferably a part of.

The at least one advertising message may be transmitted to the data base as an individual data file or may alternatively be combined with other advertising messages to increase efficiency of transmission to the database. Once the advertising message or messages have been transmitted to the database, the database then transmits the advertising message or messages to individual wireless communication devices that have been configured with the necessary software to receive and display the advertising message or messages. Transmission of the advertising message or messages to the wireless communication devices is preferably performed according to a predetermined schedule. Those of skill in the art will appreciate that the schedule may be dynamic and irregular, but nonetheless, establishes the transmission criteria for transmission of the advertising message or messages to the individual wireless communication device, such as a PCS terminal.

After transmission of the advertising message from the database to the individual communication device, the date and time of the transmission are electronically recorded and receipt of the advertising message by the individual communication device is confirmed. The advertising message or messages are then preferably stored in the RAM of the individual communication device and are displayed according to a predetermined schedule, according to a predetermined prioritization scheme, or alternatively the display schedule or sequence may be transmitted with the advertising message or messages. It will be appreciated that the predetermined display schedule may comprise designators associated with any particular advertising message and a program, previously loaded and stored on the individual communication device to recognize and rank order the designator associated with each advertising message transmitted.

Continuing with the embodiment of the invention illustrated in FIG. 9, the individual wireless communication device then displays the advertising message or messages according to the hierarchy of designators established in the display programming previously loaded onto the communication device. The display of the advertising message preferably does not interfere with the operability or functionality of the communication device and is most preferably passive to an interruption event.

An interruption event is a member of the group comprising a keypad input, an incoming transmission, an outgoing transmission, any display initiated by the programming of the telephone or other wireless communication device associated with the operation of the telephone, tuning the telephone on or off, and other similar functional events associated with the operation of the telephone and the like. The incoming transmission is a member of the group comprising a call, a voice mail message, an electronic mail message, a page, a stock quote, or any other similar transmission type commonly associated with wireless communications systems.

The display sequence of the advertising messages is preferably continued for a designated period of time, such as one month, one week, or ten days. The display period for each advertising method may coincide or be coordinated with the billing cycle of the wireless communication system provider.

Finally, the valuation method of one embodiment of the invention, applies the valuation of the advertising method to the operating cost of the individual communication device, typically a subscription account or service plan. By applying the valuation of the advertising message to the user's subscription account, this method preferably reduces the cost to the user of operating the wireless communication device.

The above invention has been described with specific embodiments, but a person skilled in the art could introduce many variations on these embodiments without departing from the spirit of the disclosure or from the scope of the appended claims. The embodiments are presented for the purpose of illustration only and should not be read as limiting the invention or its application. Therefore, the claims should be interpreted commensurate with the spirit and scope of the invention.

I claim:

1. A method for providing advertising information to a wireless communication device, comprising:
   downloading the advertising information into a memory of the wireless communication device according to a predetermined schedule; and
   displaying from the memory, display messages of the advertising information on the wireless communication device for a specified time period according to a specified repetitive play sequence, wherein displaying the display messages does not interfere with the normal use of the wireless communication device, and a display message in the play sequence is displayed from a power-up of the wireless communication device until the wireless communication device is powered-down, and a next display message in the play sequence is displayed from a next power-up of the wireless communication device until a next power-down of the wireless communication device.

2. The method of claim 1, including displaying a priority display message before displaying display messages according to the specified repetitive play sequence.

3. The method of claim 2, wherein a display message is a priority display message associated with a particular date.

4. The method of claim 1, wherein the predetermined schedule is selected from the group of a month, a week, ten days, and a billing cycle of the wireless communication network provider.

5. The method of claim 1, including:
   creating information for display on the wireless communication device;
   recording the information onto a recording medium; and
   transferring the information from the recording medium to a database in communication with a wireless communication network, wherein the advertising information is downloaded from the database, via the wireless communication network, into the memory of the wireless communication device.

6. The method of claim 1, further comprising the step of marking a display message as played in the specified play sequence only after the display message is displayed for the specified time interval.

7. The method of claim 1, wherein the downloaded advertising information includes a display schedule.

8. A method for providing advertising information to a wireless communication device, comprising:
valuating allowance by a user of display of the advertising information on the wireless communication device over a specified period of time;
transmitting the advertising information to the wireless communication device;
displaying the advertising information according to a specified schedule for a specified period of time; wherein the display of the advertising information does not interfere with the normal use of the wireless communication device; and
applying the valuation for allowance of display of the advertising information to the user,
wherein a display message in the play sequence is displayed from a power-up of the wireless device until the wireless device is powered-down, and a next display message in the play sequence is displayed from a next power-up of the wireless device until a next power-down of the wireless device.

9. The method of claim 8, wherein
applying the valuation includes reducing the cost to the user of the wireless communication device.

10. The method of claim 8, wherein
the advertising information includes advertisements; and
applying the valuation includes shifting a portion of the user's costs for subscribing to a wireless service to an advertiser.

11. The method of claim 8, wherein applying the valuation includes reducing the cost to the user of a service plan with a network provider for the specified period of time.

12. A method for providing advertisements to a wireless communication device, comprising:
valuating allowance of display of advertisements on a wireless communication device for a specified period of time;
transmitting the advertisements to the wireless communication device;
storing the advertisements in a memory of the wireless communication device for the specified period of time;
displaying the advertisements according to a specified repetitive display sequence during the specified period of time; wherein the displaying does not interfere with the normal use of the wireless communication device; and
crediting a user account with the valuation for allowance of display of the advertisements,
wherein an advertisement in the display sequence is displayed from a power-up of the wireless device until the wireless device is powered-down, and a next advertisement in the display sequence is displayed from a next power-up of the wireless device until a next power-down of the wireless device.

13. The method of claim 12, wherein:
displaying is discontinued during an interruption event; and
displaying according to the display sequence resumes at the termination of an interruption event with an advertisement being displayed when the interruption event occurred.

14. The method of claim 12, wherein:
displaying is discontinued during an interruption event; and;
displaying according to the display sequence resumes at the termination of an interruption event with an advertisement in the display sequence that follows an advertisement being displayed when the interruption event occurred.

15. The method of claim 12, wherein displaying according to the display sequence begins after power-up of the wireless device with advertisement that has not previously been initially displayed after a power-up.

16. The method of claim 12, wherein one advertisement of the display sequence is displayed after power-up until occurrence of an interruption event, and the next advertisement of the display sequence is displayed after the interruption event until another interruption event occurs.

17. The method of claim 12, wherein:
a particular advertisement has a scheduled display duration;
displaying of the particular advertisement is discontinued during an interruption event; and
displaying according to the display sequence resumes at the termination of an interruption event with the particular advertisement being displayed for a time equal to a remainder of the scheduled display duration which did not elapse prior to the interruption event.

18. The method of claim 12, wherein the specified period of time coincides with a billing cycle of a wireless communication network provider.

19. The method of claim 12, including:
associating a designator with each of the advertisements; and wherein the display sequence is predetermined in the wireless communication device based on a hierarchy of the designators.

* * * * *